Figure 1:
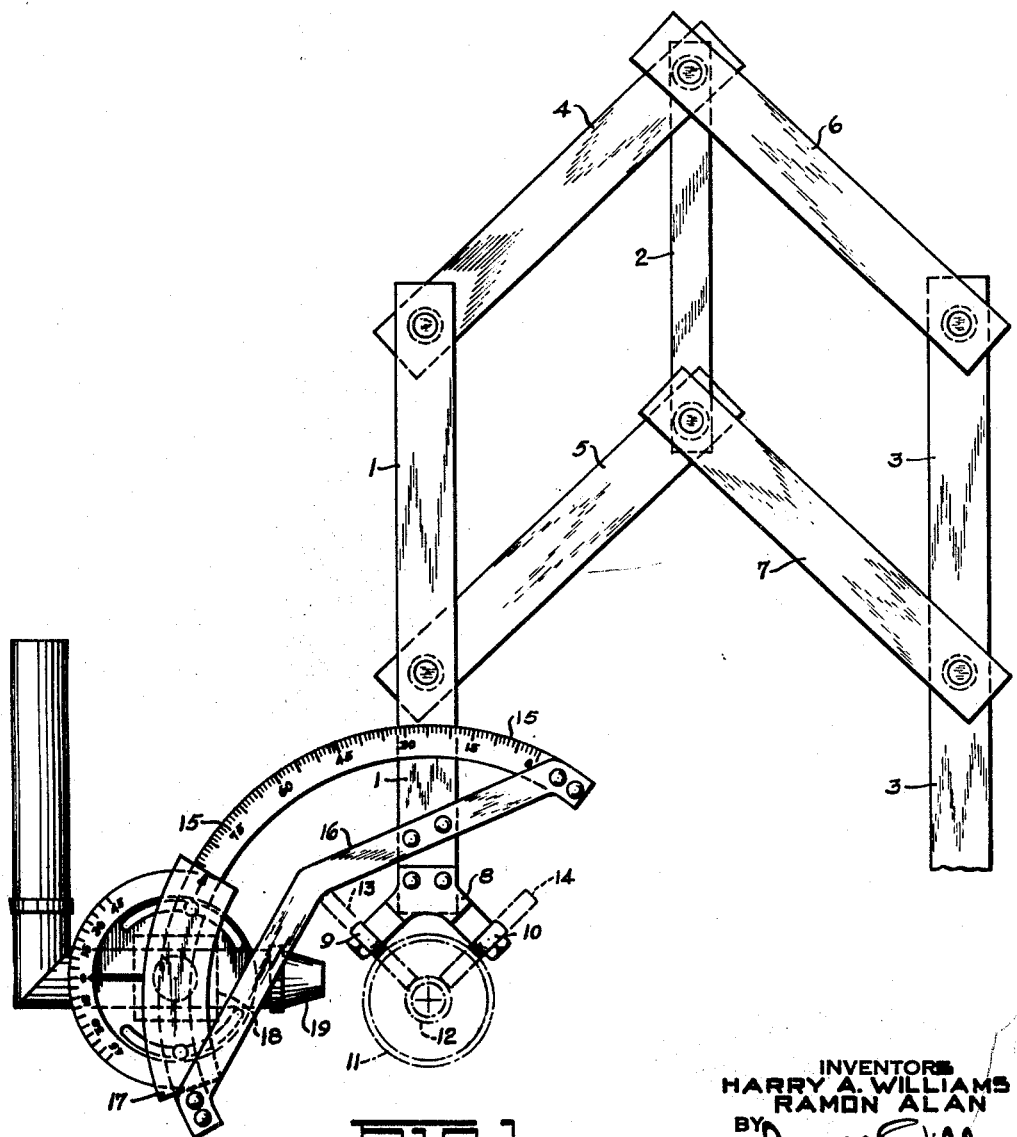

June 14, 1960     H. A. WILLIAMS ET AL     2,940,305
ARRANGEMENT FOR POSITIONING ULTRASONIC PROBE
Filed May 21, 1956     5 Sheets-Sheet 2

INVENTORS
HARRY A. WILLIAMS
RAMON ALAN
BY
AGENT

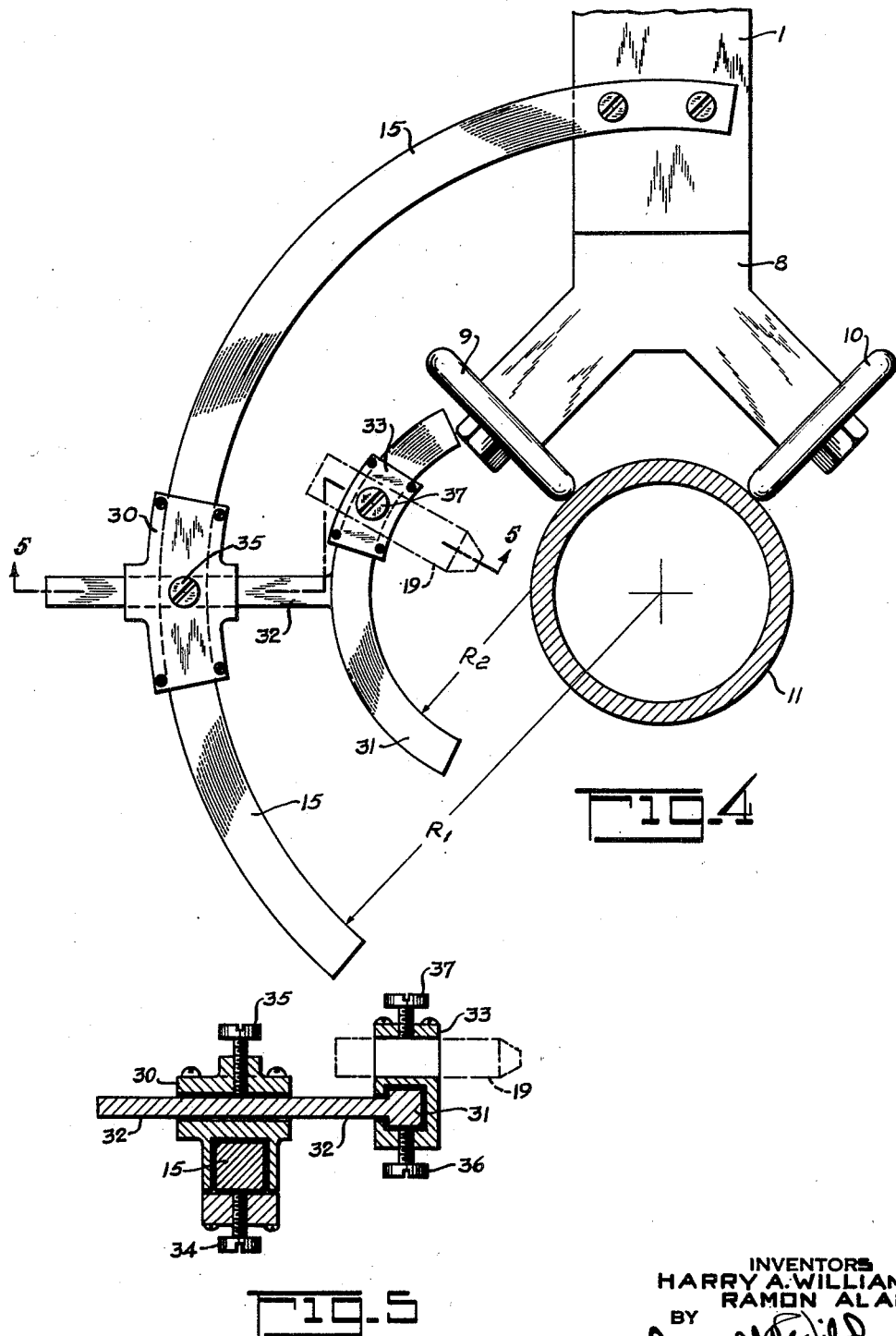

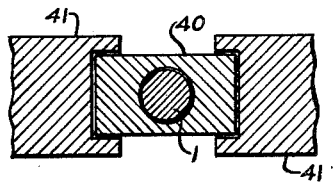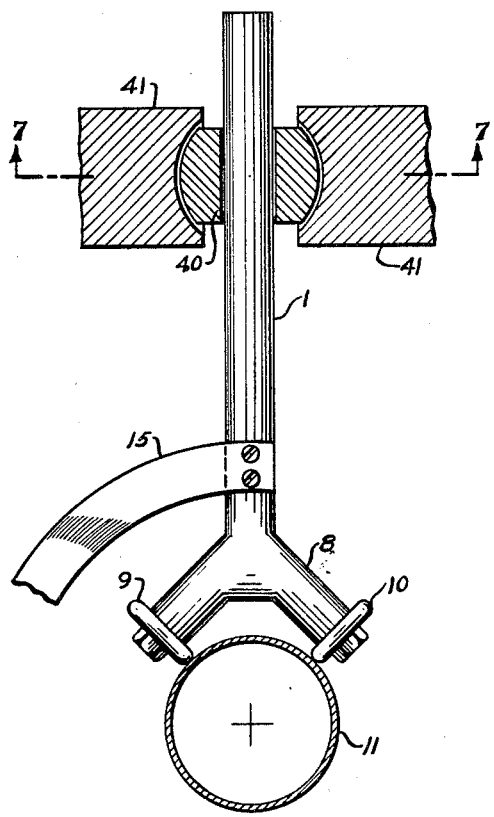

2,940,305
ARRANGEMENT FOR POSITIONING ULTRASONIC PROBE

Harry A. Williams, Morristown, and Ramon Alan, Fairlawn, N.J., assignors to Curtiss-Wright Corporation, a corporation of Delaware Filed May 21, 1956, Ser. No. 586,091

8 Claims. (Cl. 73—67.8)

This invention relates to ultrasonic inspection of tubular and rod-shaped material, and more particularly relates to a device for maintaining an ultrasonic transducer probe in a predetermined space relation to such material in spite of deformations of such material.

In ultrasonic inspection of material in tubular or rod form, it is conventional to impart ultrasonic vibrations to the piece under test under an angle other than normal to the tangent at the point of incidence on the surface of the piece being inspected, the point of incidence being generally considered to be the intersection of the axis of the probe with the surface. This is accomplished by positioning a piezoelectric transducer probe at a predetermined angle with respect to the test piece. In the case of tubular material, the ultrasonic waves travel between the outer and inner surfaces by repeated successive reflections therefrom in a generally peripheral direction. When the waves encounter a defect or flaw, such as a crack, they are reflected back to the transducer probe. Reflected waves are usually made visible on the fluorescent screen of a cathode ray tube to indicate the presence of a defect in the piece being inspected.

In practice, tubular and rod material in the process of manufacture is not perfectly straight, but it is subject to distortion in the form of a curved centerline. This alters the relative position of transducer probe and the surface at which ultrasonic waves are imparted to the test piece. To a minor degree, this is also caused by egg-shaped distortion of the cross section of the material. Such distortions change the course of ultrasonic waves in the test piece considerably and might cause defects to pass undetected or produce false indications of defects. Manual readjustment of the probe position is impractical when inspection is to be effected with the test piece in motion.

It is an object, therefore, of the present invention to provide an improved device for supporting an ultrasonic probe, which maintains an ultrasonic probe substantially in a predetermined space relation with respect to cylindrical surface of the tubular or rod-shaped material under test while moving.

In accordance with the present invention, there is provided a device for supporting an ultrasonic probe for inspection of objects with a substantially cylindrical outer surface with an axial centerline which comprises an arm, means for guiding the arm, and a section of circular track of predetermined radius fixed to this arm. Means attached to one end of this arm are also provided, these means being engageable with the aforesaid cylindrical surface to maintain the relative position of the track and the surface such that the track is a section of a circle about the centerline with the aforesaid predetermined radius. A member is slidably coupled to the track and means associated with that member are provided, which permit adjustment of the axis of the probe throughout a range of angles with respect to the tangent at the intersection of the axis and the aforesaid surface.

For a better understanding of the invention, together with other and further objects thereof, reference is had to the following description taken in connection with the accompanying drawing and its scope will be pointed out in the appended claims.

Figure 2:
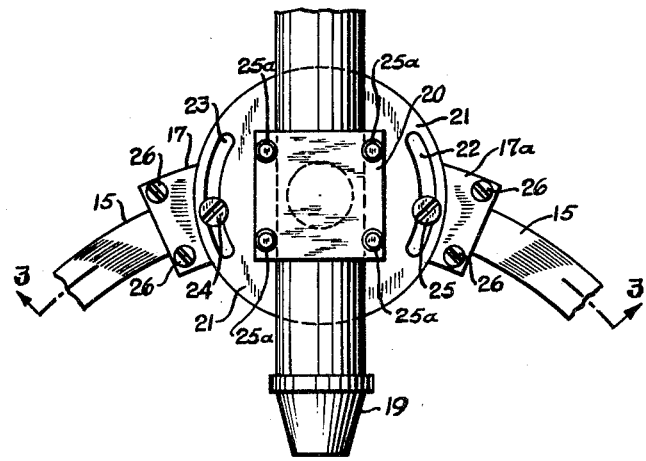
Figure 3:
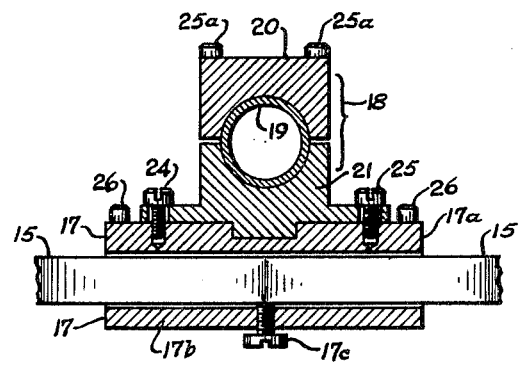
Figure 8:
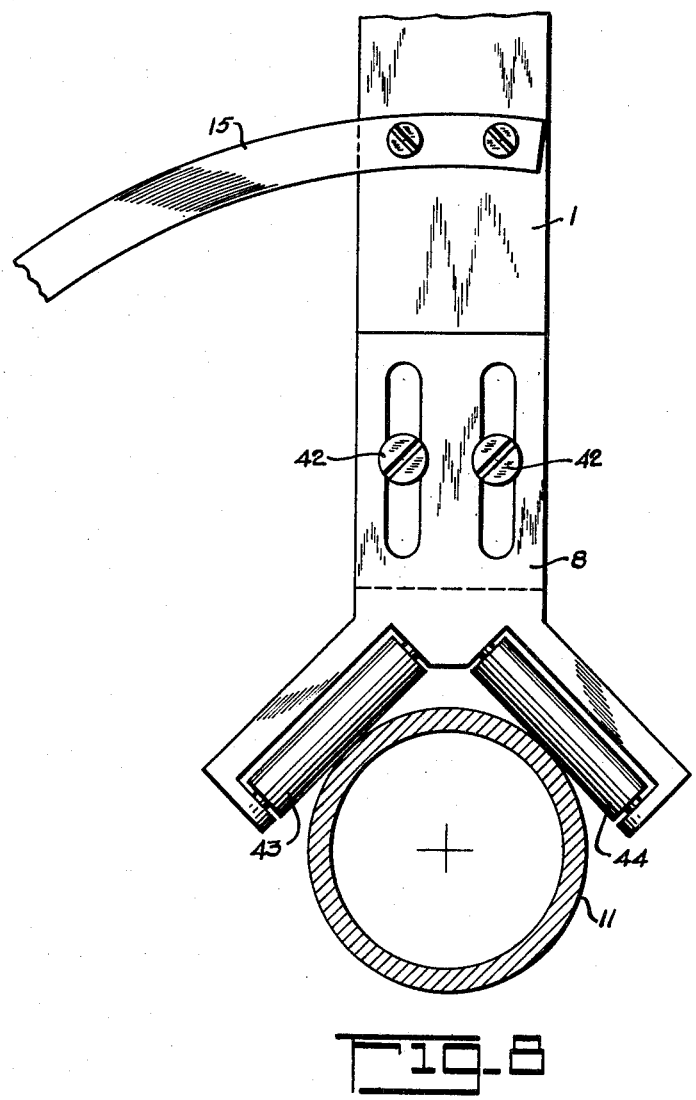

In the accompanying drawings, Fig. 1 shows a first embodiment of the invention, while Figs. 2 and 3 show constructional details of this embodiment. Fig. 4 shows a second embodiment, Fig. 5 shows a constructional detail of the last-named embodiment, while Fig. 6 shows a third embodiment, with Fig. 7 showing a constructional detail of this last embodiment. Finally, Fig. 8 shows a modification applicable to all embodiments shown.

Referring now more particularly to Fig. 1, the device illustrated comprises an arm 1, which is part of a pantographic mechanism comprising arms 2, 3, 4, 5, 6, and 7, adapted to guide arm 1. Arm 3 is fixedly mounted in space by means not shown. Attached to the lower end of arm 1 is a forked member 8 provided with wheels 9 and 10, which engage with the outer cylindrical surface of a piece of tubular material 11 under test, assumed to be moving in a direction substantially perpendicular to the plane of the drawing. For purposes of explanation of the operation, there are also shown a piece of tubular material 12 and wheels 13 and 14, all shown by broken lines.

Attached to the lower end of the arm is also a section of circular track 15, whose center coincides with the centerline of tubular pieces 11 and 12. Track 15 is attached to arm 1 by means of a member 16 screwed to arm 1 and track 15, respectively, as shown.

A slidable member 17 is coupled to the track and carries a support, generally indicated at 18, for supporting an ultrasonic probe 19, which can be pivotally adjusted.

Figs. 2 and 3 show in greater detail the arrangement of support 18 and probe 19. In Figs. 1, 2, and 3, the same elements are indicated by the same numerals. The support generally indicated at 18 comprises two parts, 20 and 21, whereby the lower part 21 pivots about its center, is guided by curved slots 22 and 23, and held in position by screws 24 and 25. Probe 19 is held between members 20 and 21 with the aid of screws 25a. Slidable member 17 consists of an upper part 17a and a lower part 17b, as indicated, held together by screws 26. For clamping member 17 and support 18 with probe 19 to the track 15, there is provided a clamping screw 17c. For the sake of clarity, the probe 19 is not shown in Fig. 3.

Fig. 4 shows a second embodiment of the invention, again including a guided arm 1, which can be included in and guided by a pantographic device as in the previous embodiment, illustrated by Fig. 1. Again, a forked member 8 is provided with wheels 9 and 10 engageable with the outer surface of a tubular piece of material 11 under inspection.

A first section 15 of circular track is provided carrying a member generally indicated at 30, slidably coupled to track 15. A second track 31 is provided, having an arm 32 attached thereto, which is adjustably held by the member generally indicated at 30. A member generally indicated at 33 is slidably attached to track 31 and supports probe 19. The radii $R_1$ and $R_2$ of tracks 15 and 31, respectively, and the spacing between the tracks are in a particular relation to one another and to the outer diameter of tubular piece 11, as will be explained later in detail.

Fig. 5 shows a cross section of the arrangement of Fig. 4 along line 5—5, and again the same elements are indicated by the same numerals as in Fig. 4. Member 30 can be slid along track 15 and clamped thereto by a clamping screw 34. Arm 32 is radially adjustable and can be held in position by clamping to member 30 by means of clamping screw 35. Member 33 can be slid along track 31 and clamped thereto by a screw 36. The ultrasonic probe 19 can be axially adjusted with respect to member 33 and clamped in position by means of screw 37.

Another embodiment of the invention is schematically illustrated by Figs. 6 and 7, in which again the same elements as in previous embodiments are indicated by the same numerals. This embodiment differs from the embodiments of Figs. 1 and 4, respectively, only in that different guiding means are provided for arm 1, namely, an apertured guided disc arrangement in which a disc 40 is held and guided in a support 41, so that arm 1 is free to move in a plane substantially perpendicular to the centerline of tubular piece 11.

In Fig. 8, wheels 9 and 10 of previous embodiments are replaced by rollers 43 and 44 engaging with the outer surface of test piece 11. In order to avoid replacement of the rollers by rollers of different diameter when material of different diameter is to be tested, the forked member 8, also shown in Figs. 1 and 4, is now slidably attached to arm 1 supporting 15, and is clamped in position by screws 42.

In operation, the arrangement of Fig. 1 is movable with respect to the fixed arm 3 of the pantograph and rides on the surface of tubular test piece 11 by means of wheels 9 and 10, engaged with the outer surface of piece 11. The test piece 11 is vertically guided by means not shown, and is assumed to move in a direction perpendicular to the plane of the drawing. The point of incidence of the ultrasonic waves emanating from probe 19 and the angle of incidence with respect to the tangent at the point of incidence can be adjusted by sliding the position of slidable member 17 along track 15 and by rotating the probe support 18, more specifically illustrated in Fig. 3. Ultrasonic coupling between probe 19 and test piece 11 is obtained by immersing both these elements in a liquid, not shown. If now, test piece 11 is distorted so that its centerline moves either in the vertical or in the horizontal direction, or in a direction having both horizontal and vertical components, the relative positions of probe 19 and test piece 11 will remain substantially the same, track 15 remains to be part of a circle struck around the centerline of piece 11, and particularly the angle of incidence of the ultrasonic waves imparted to test piece 11 will not be altered.

If the size of the test piece is changed, as, for example, indicated by test piece 12, illustrated by broken lines, wheels 9 and 10 are exchanged for a substitute set of wheels 13 and 14 of greater diameter, indicated by broken lines, so that the spacing between the centerline of the test piece and the axes of the wheels remain the same. In other words, the sum of the outer radius of the test piece and the radius of the wheels must remain constant in order to preserve the same point and the same angle of incidence of ultrasonic waves imparted to a test piece. If this requirement is fulfilled, the need for readjusting the position of probe 19 with respect to a test piece is eliminated.

In an actual tubing mill or machinery for making rod-like material, the vertical support for test pieces of different diameter generally remains at the same level for material of various diameters, so that their centerlines will not be coincident as shown in Fig. 1. This is immaterial, however, since a change in vertical position of the centerline does not affect the relative positions of the probe and the test piece, as pointed out above.

When adjusting the arrangement for a given test piece, wheels 9 and 10 of an appropriate diameter are selected and attached to the forked member 8, whereby the wheel diameter must be of such dimension that the track 15 constitutes a circle struck about the centerline of the test piece as its center. By sliding member 17 along track 15 and rotating probe support 18 with respect to member 17, the desired point and angle of incidence of ultrasonic energy with respect to the outer surface of the test piece is adjusted. Screws 17c and 24 and 25 are then tightened and hold probe 19 in the desired position.

In adjusting the arrangement of Fig. 4, the diameters of wheels 9 and 10 are again selected so that track 15 constitutes a circle struck about the centerline of the test piece 11 as its center. The radius $R_2$ of track 31, which might be arbitrarily chosen, determines the position which track 31 must have with respect to track 15 for a test piece of given outer diameter. In setting up the device, the point of incidence is selected by sliding member 30 along track 15. The position of member 30 on track 15 is then secured by tightening clamping screw 34. The position of track 31 is subsequently so adjusted by sliding the arm 32 through an opening in member 30 to the position where track 31 constitutes a circle of radius $R_2$ struck about the selected point of incidence on the outer surface of test piece 11. The angle of incidence is adjusted by sliding member 33 along track 15. Arm 32 and member 33 are clamped in position by screws 35 and 36 when the proper positions have been found. Probe 19 can be axially adjusted and clamped in place by screw 37. The axial position of probe 19 does not alter the point or angle of incidence, however.

Again, for a movement of the test piece in either horizontal or vertical direction or both, neither the point nor the angle of incidence changes as long as wheels 9 and 10 remain engaged with the outer surface of the test piece.

In the embodiment shown in Fig. 6, the adjustment of point and angle of incidence is the same as described before depending upon whether the members attached to track 15 are those shown in Fig. 1 or in Fig. 4. If the test piece moves in vertical direction, the arrangement of Fig. 6 will not produce a change in the point or in the angle of incidence. However, since arm 1 is now pivotally arranged around a center located in the opening in the apertured disc 40, a movement of test piece 11 in a horizontal direction at right angles to its centerline produces a change in the point of incidence but not in the angle of incidence, as long as wheels 9 and 10 remain engaged with the outer surface of test piece 11. The weight of arm 1 and of the apparatus attached thereto is relied on to insure engagement of wheels 9 and 10 with test piece 11. Should this weight alone be insufficient, additional weight can be added to arm 1, as will be obvious to those skilled in the art.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A device for supporting an ultrasonic probe for inspection of objects having a substantially cylindrical outer surface with an axial centerline, comprising an arm, means for guiding said arm, a section of circular track of predetermined radius fixed to said arm, means attached to one end of said arm and engagable with said surface substantially to maintain the relative positions of said track and said surface such that said track is a section of a circle about said centerline with said predetermined radius, a member slidably coupled to said track and being movable on and in the circular path of said track, and adjusting means supported by said member for supporting an ultrasonic probe and for selectively adjusting the axis of said probe throughout a range of angles with respect to the tangent at the intersection of said axis of the probe with said surface.

2. A device for supporting an ultrasonic probe for inspection of objects having a substantially cylindrical outer surface with an axial centerline, comprising an arm, means for guiding said arm, a section of circular track of predetermined radius fixed to said arm, means rotatably attached to one end of said arm and engageable with said surface substantially to maintain the relative positions of said track and said surface such that said track is a section of a circle about said center line with said predetermined radius, a member slidably coupled to said track and being movable on and in the circular path of said track, and adjusting means supported by said member for supporting an ultrasonic probe and for selectively adjusting the axis of said probe throughout a range of angles with respect to the tangent at the intersection of said axis of the probe with said surface.

3. A device for supporting an ultrasonic probe for inspection of objects having a substantially cylindrical outer surface with an axial centerline, comprising a pantograph device including an arm movable in a plane substantially perpendicular to said centerline, a section of circular track of predetermined radius fixed to said arm, means attached to one end of said arm and engageable with said surface substantially to maintain the relative positions of said track and said surface such that said track is a section of a circle about said centerline with said predetermined radius, a member slidably coupled to said track and being movable on and in the circular path of said track, and adjusting means supported by said member for supporting an ultrasonic probe and for selectively adjusting the axis of said probe throughout a range of angles with respect to the tangent at the intersection of said axis of the probe with said surface.

4. A device for supporting an ultrasonic probe for inspection of objects having a substantially cylindrical outer surface with an axial centerline, comprising an arm, pivotal means including a linear guide for said arm, permitting movement of said arm in a plane substantially perpendicular to said centerline, a section of circular track of predetermined radius fixed to said arm, means attached to one end of said arm and engageable with said surface substantially to maintain the relative positions of said track and said surface such that said track is a section of a circle about said centerline with said predetermined radius, a member slidably coupled to said track and being movable on and in the circular path of said track, and adjusting means supported by said member for supporting an ultrasonic probe and for selectively adjusting the axis of said probe throughout a range of angles with respect to the tangent at the intersection of said axis of the probe with said surface.

5. A device for supporting an ultrasonic probe for inspection of objects having a substantially cylindrical outer surface with an axial centerline, comprising an arm, means for guiding said arm, a first section of circular track of predetermined radius fixed to said arm, means attached to one end of said arm and engageable with said surface substantially to maintain the relative positions of said track and said surface such that said track is a section of a circle about said centerline with said predetermined radius, a first member slidably coupled to said first-named track, a second section of circular track of predetermined radius, a second arm operatively engaged with said second track and said first member extending in a radial direction with respect to said centerline to maintain the relative positions of said second track and said surface such that said second track is a section of a circle about a point on said surface, and means movably supported on said second section of circular track for supporting an ultrasonic probe and for selectively adjusting the axis of said probe throughout a range of angles with respect to the tangent at said point on said surface.

6. In an apparatus for the inspection of elongated objects having an axis by penetrating inspection rays wherein the object is adapted to be moved along a predetermined path substantially in its axial direction, in combination, a support member spaced from the predetermined path of movement of the object; guiding means movably mounted on said support member for engaging the object to be inspected as the same is moved along its predetermined path; inspection means arranged on said guiding means and being movable therewith, said inspection means being spaced from said predetermined path of movement of the object for emitting penetrating inspection rays directed toward the object as the same moves along its predetermined path; and adjusting means for initially adjusting the point of impingement and angle of incidence of said inspection rays on said object, said adjusting means providing movement for said inspection means about an axis of revolution substantially coinciding with the axis of the elongated object and providing rotational movement of said inspection means about an axis parallel to and sapced from said axis of revolution whereby the initial point of impingement and angle of incidence of said inspection rays adjusted by said adjusting means are constantly maintained by said guiding means as the object is moved along its predetermined path.

7. In an apparatus for the inspection of elongated objects having an axis by ultrasonic vibrations wherein the object is adapted to be moved along a predetermined path substantially in its axial direction, in combination, a support member spaced from the predetermined path of movement of the object; guiding means movably mounted on said support member for engaging the object to be inspected as the same is moved along its predetermined path; inspection means arranged on said guiding means and being movable therewith, said inspection means being spaced from said predetermined path of movement of the object for emitting a beam of ultrasonic vibrations directed toward the object as the same moves along its predetermined path; and adjusting means for initially adjusting the point of impingement and angle of incidence of said beam of ultrasonic vibrations on said object, said adjusting means providing movement for said inspection means about an axis of revolution substantially coinciding with the axis of the elongated object and providing rotational movement of said inspection means about an axis parallel to and spaced from said axis of revolution whereby the initial point of impingement and angle of incidence of said beam of ultrasonic vibrations adjusted by said adjusting means are constantly maintained by said guiding means as the object is moved along its predetermined path.

8. In an apparatus for the inspection of elongated objects having an axis by penetrating inspection rays wherein the object is adapted to be moved along a predetermined path substantially in its axial direction, in combination, a fixedly mounted support member spaced from the predetermined path of movement of the object; guiding means movably mounted on said support member for engaging the object to be inspected as the same is moved along its predetermined path; and inspection means adjustably arranged on said guiding means and being movable therewith, said inspection means being spaced from said predetermined path of movement of the object for emitting penetrating inspection rays directed toward the object as the same moves along its predetermined path and being adjustable to initially adjust the point of impingement and angle of incidence of said inspection rays on said object, said inspection means being movable about an axis of revolution substantially coinciding with the axis of the elongated object and being rotatable about an axis parallel to and spaced from said axis of revolution whereby the initial point of impingement and angle of incidence of said inspection rays are constantly maintained by said guiding means as the object is moved along its predetermined path.

References Cited in the file of this patent

UNITED STATES PATENTS

| | | |
|---|---|---|
| 2,035,765 | Schmidt | Mar. 31, 1936 |
| 2,486,902 | Wolf | Nov. 1, 1949 |
| 2,527,986 | Carlin | Oct. 31, 1950 |
| 2,725,491 | Haswell | Nov. 29, 1955 |